(No Model.)
L. EPSTEIN.
SECONDARY VOLTAIC BATTERY.
No. 543,680. Patented July 30, 1895.
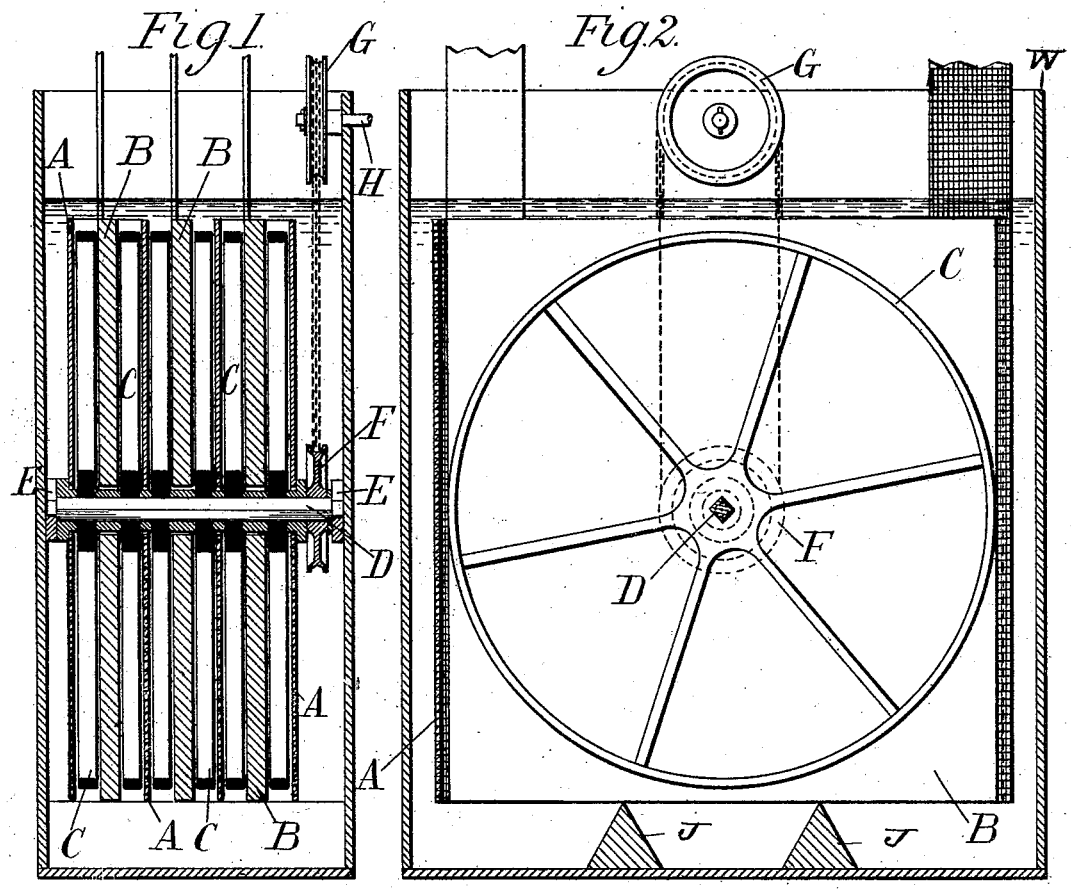
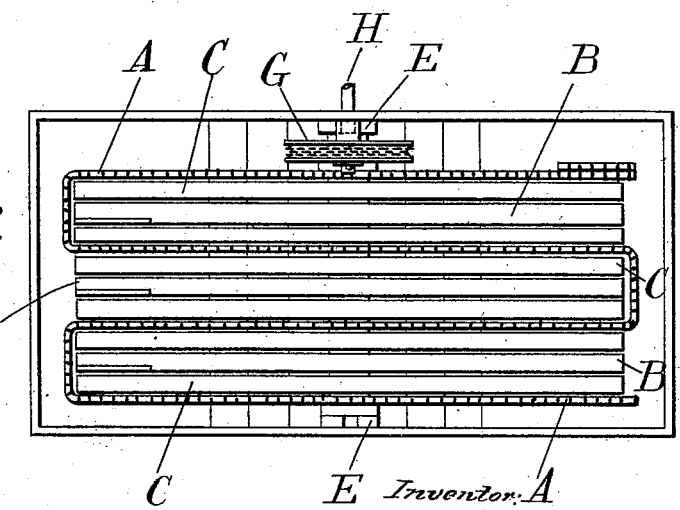
Witnesses:
J. M. Witherow
James R. Mansfield
Inventor:
Ludwig Epstein
per Alexander & Dowell
attys

UNITED STATES PATENT OFFICE.

LUDWIG EPSTEIN, OF LONDON, ENGLAND.

SECONDARY VOLTAIC BATTERY.

SPECIFICATION forming part of Letters Patent No. 543,680, dated July 30, 1895.

Application filed January 5, 1895. Serial No. 533,931. (No model.) Patented in France January 2, 1895, No. 244,081; in Belgium January 2, 1895, No. 113,496; in Italy January 18, 1895, LXXIV, 245, and in Canada February 4, 1895, No. 48,124.

*To all whom it may concern:*

Be it known that I, LUDWIG EPSTEIN, a citizen of Austria, residing at 215 Gresham House, Old Broad Street, in the city and county of London, England, have invented certain new and useful Improvements in Secondary Voltaic Batteries, (for which I have obtained patents in the following countries: Canada, February 4, 1895, No. 48,124; France, January 2, 1895, No. 244,081; Belgium, January 2, 1895, No. 113,496; and Italy, January 18, 1895, LXXIV, 245,) of which the following is a specification.

My invention relates to a construction of secondary voltaic battery in which are employed negative plates having an extended zinc surface, and means are provided for insuring uniform action over the whole surface of the plates, notwithstanding difference of density of the liquor electrolyte at different levels. I am thus enabled to render the battery more effective, and effective for a longer period after being charged.

I shall describe a cell of a secondary battery according to my invention, referring to the accompanying drawings.

Figures 1 and 2 are vertical sections on planes at right angles to each other, and Fig. 3 is a plan of a cell of a secondary battery arranged according to my invention.

A indicates negative plates which may be separate sheets, but are preferably parts of a single sheet which is bent to and fro in zigzags, a flat portion coming between each pair of parallel positive plates B. These positive plates are separated from the negative plates by spaces, in each of which there is an agitator C in the form of a wheel having its boss fixed on a spindle D, which is journaled in bearings E on the ends of the cell. A pulley F on the spindle is connected by a chain or band with a pulley G on a spindle H mounted on the upper part of the cell-wall above the level of the electrolyte. The spindle H may be mechanically connected to corresponding spindles on other cells, on turning which, either continuously or at intervals, the pulleys F and the agitators C are caused to revolve, the liquid electrolyte being thus stirred, so that its density is rendered uniform throughout, its depth. The agitators C may be wheels, as shown, with openings between their spokes. Their form may obviously be varied in many ways, provided that in revolving they act as agitators. In any case they are made of non-conducting material which is not acted on by the electrolyte—such, for instance, as ebonite—and the spindle passes through holes of the plates so large that there is no contact of the spindle with the plates.

The positive plates B may be of any known kind employed in secondary batteries. The negative plates A, or the bent sheet of which they form portions, is preferably of wire-gauze, preferably copper, which has been amalgamated and electrolytically coated with zinc.

The plates are contained in an ordinary cell W, and supported on triangular non-conducting supports J, in the usual manner.

The plates B are usually of lead, with their surfaces prepared to hold lead oxide, as usual.

The electrolyte is usually acidulated water, but any other proper excitant for secondary batteries may be employed.

Although I have shown only four negative and three positive plates in the cell, there may obviously be a greater or less number.

Having thus described the nature of my invention and the best means I know for carrying the same into practical effect, I claim—

1. In a secondary battery, the combination with a negative plate made of wire gauze electrolytically coated with zinc, of positive plates inserted between the negative plates, and revolving agitators of insulating material interposed between the opposed surfaces of the positive and negative plates, substantially as and for the purpose set forth.

2. In a secondary battery the combination with a continuous negative plate consisting of a sheet of wire gauze or foraminous metal amalgamated and electrolytically coated with zinc, and bent back and forth upon itself; of positive plates inserted between the folds or bends of the negative plate, and agitators interposed between the opposed surfaces of the positive and negative plates, substantially as and for the purpose described.

In testimony whereof I have signed my name to this specification, in the presence of two subscribing witnesses, this 21st day of December, A. D. 1894.

LUDWIG EPSTEIN.

Witnesses:
OLIVER IMRAY,
JNO. P. M. MILLARD.